United States Patent
Ramanathan et al.

(10) Patent No.: US 9,645,987 B2
(45) Date of Patent: May 9, 2017

(54) TOPIC EXTRACTION AND VIDEO ASSOCIATION

(75) Inventors: Krishnan Ramanathan, Karnataka (IN); Yogesh Sankarasubramaniam, Karnataka (IN); Vidhya Govindaraju, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 88 days.

(21) Appl. No.: 14/241,483

(22) PCT Filed: Dec. 2, 2011

(86) PCT No.: PCT/IN2011/000822
§ 371 (c)(1),
(2), (4) Date: Feb. 27, 2014

(87) PCT Pub. No.: WO2013/080214
PCT Pub. Date: Jun. 6, 2013

(65) Prior Publication Data
US 2014/0229810 A1    Aug. 14, 2014

(51) Int. Cl.
*G06F 17/00* (2006.01)
*G06F 17/24* (2006.01)
*G06F 17/30* (2006.01)

(52) U.S. Cl.
CPC ...... *G06F 17/241* (2013.01); *G06F 17/30038* (2013.01); *G06F 17/30882* (2013.01)

(58) Field of Classification Search
None
See application file for complete search history.

(56) References Cited

U.S. PATENT DOCUMENTS

| 7,493,312 | B2 | 2/2009 | Liu et al. |
| 9,529,918 | B2 * | 12/2016 | Simhon ............ G06F 17/30867 |
| 2005/0097628 | A1 * | 5/2005 | Lussier ................. A61K 31/63 800/260 |
| 2007/0244902 | A1 | 10/2007 | Seide et al. |
| 2009/0235150 | A1 | 9/2009 | Berry |
| 2009/0259927 | A1 * | 10/2009 | Fisher ........................... 715/205 |
| 2010/0070506 | A1 * | 3/2010 | Whang ............ G06F 17/30678 707/740 |
| 2010/0281025 | A1 * | 11/2010 | Tsatsou .................. G06Q 30/02 707/733 |
| 2011/0239099 | A1 | 9/2011 | Matias et al. |
| 2011/0264653 | A1 | 10/2011 | Cierniak et al. |

(Continued)

FOREIGN PATENT DOCUMENTS

| CN | 101482975 | 7/2009 |
| CN | 102262624 | 11/2011 |

(Continued)

OTHER PUBLICATIONS

Dong, A. et al., Multimedia Access Platform for Virtual Learning Environment, (Research Paper), IEEE International Conference on Electro Information Technology, 2005, May 22-25, 2005, pp. 1-6.
International Searching Authority, The International Search Report and the Written Opinion, Jul. 12, 2012, 10 Pages.

(Continued)

*Primary Examiner* — Keith Bloomquist
(74) *Attorney, Agent, or Firm* — Rathe Lindenbaum LLP

(57) ABSTRACT

A topic is extracted from a digital text document (102). A video is selected from a video source for the extracted topic (104). The selected video is associated with the extracted topic (106).

20 Claims, 6 Drawing Sheets

(56) References Cited

U.S. PATENT DOCUMENTS

| | | | | |
|---|---|---|---|---|
| 2011/0302156 | A1* | 12/2011 | Vadlamani | G06F 17/30864 707/723 |
| 2011/0320429 | A1* | 12/2011 | Doig | G06F 17/30893 707/711 |
| 2012/0047159 | A1* | 2/2012 | Pickens | G06F 17/30648 707/765 |
| 2012/0078895 | A1* | 3/2012 | Chu-Carroll | G06F 17/30637 707/728 |
| 2012/0203584 | A1* | 8/2012 | Mishor | G06Q 30/02 705/7.11 |
| 2014/0067847 | A1* | 3/2014 | Barbieri | G06F 17/30389 707/765 |

FOREIGN PATENT DOCUMENTS

| | | |
|---|---|---|
| JP | 2002007479 | 1/2002 |
| WO | WO-0251139 | 6/2002 |

OTHER PUBLICATIONS

Jeng, Y-L. et al., Dynamic Video Retrieval System for English Language Learning, (Research Paper), First IEEE International Conference on UBI-Media Computing, 2008, Jul. 31, 2008-Aug. 1, 2008, pp. 302-307.

Mistry, P., The Thrilling Potential of Sixthsense Technology: Pranav Mistry on Ted.com, (Web Page), Nov. 4, 2010, http://www.youtube.com/watch?v=4vX-TjUnovk.

European Patent Office, Supplemental European Search Report, Aug. 7, 2015, European Patent Application No. 11876552.8, 7 pages.

Jakub Sevcech et al: "Automatic Annotation of Non-English Web Content"; Aug. 22, 2011; Aug. 22, 2011-Aug. 27, 2011, Aug. 22, 2011 (Aug. 22, 2011), pp. 281-284, XP058018073.

The International Bureau of WIPO, International Preliminary Report on Patentability for PCT/IN2011/000822 dated Jun. 12, 2014 (6 pages).

* cited by examiner

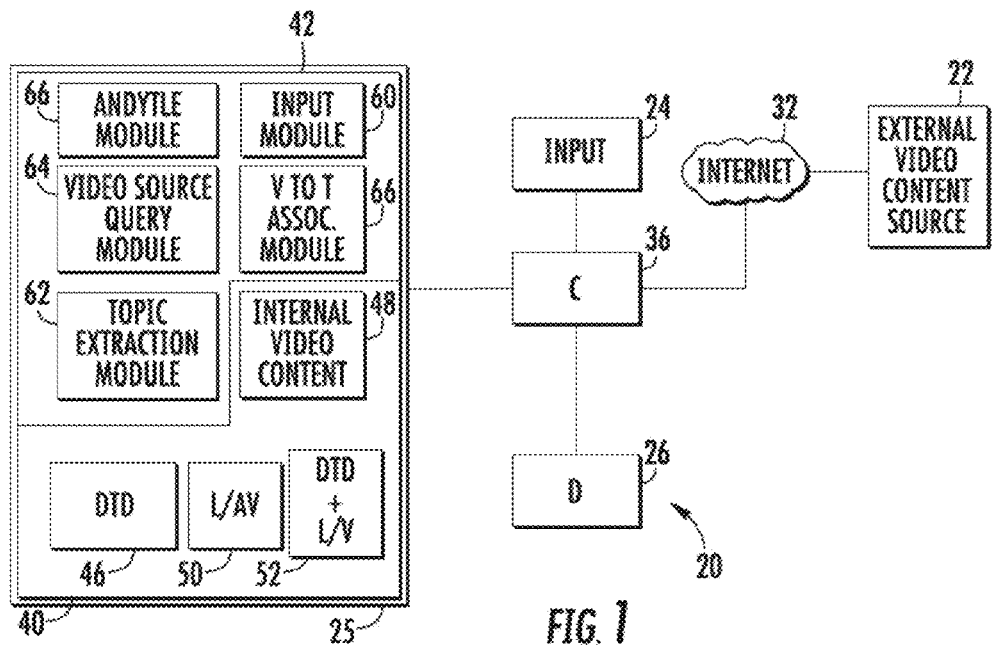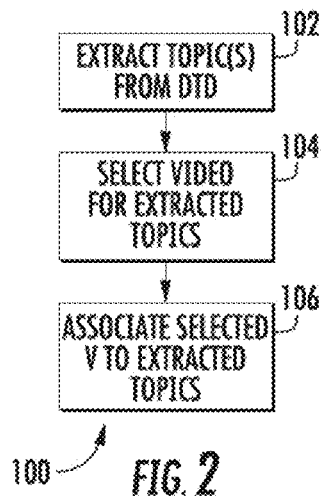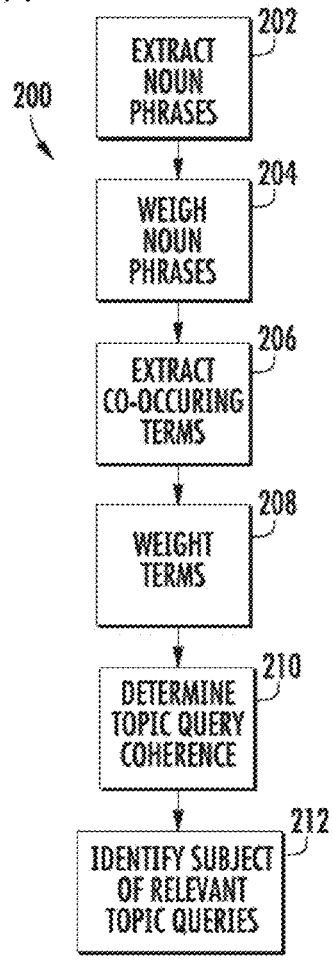

TOPIC EXTRACTION AND VIDEO ASSOCIATION

BACKGROUND

Text documents may discuss multiple topics. Although videos may provide an enhanced understanding of such topics, manually searching for and obtaining such videos may be tedious and time-consuming.

BRIEF DESCRIPTION OF THE DRAWINGS

FIG. 1 is a schematic illustration of an example topic extraction and video association system.

FIG. 2 is a flow diagram of an example topic extraction and video association method.

FIG. 3 is a flow diagram of an example topic extraction method.

DETAILED DESCRIPTION OF THE EXAMPLE IMPLEMENTATIONS

Figure 4:
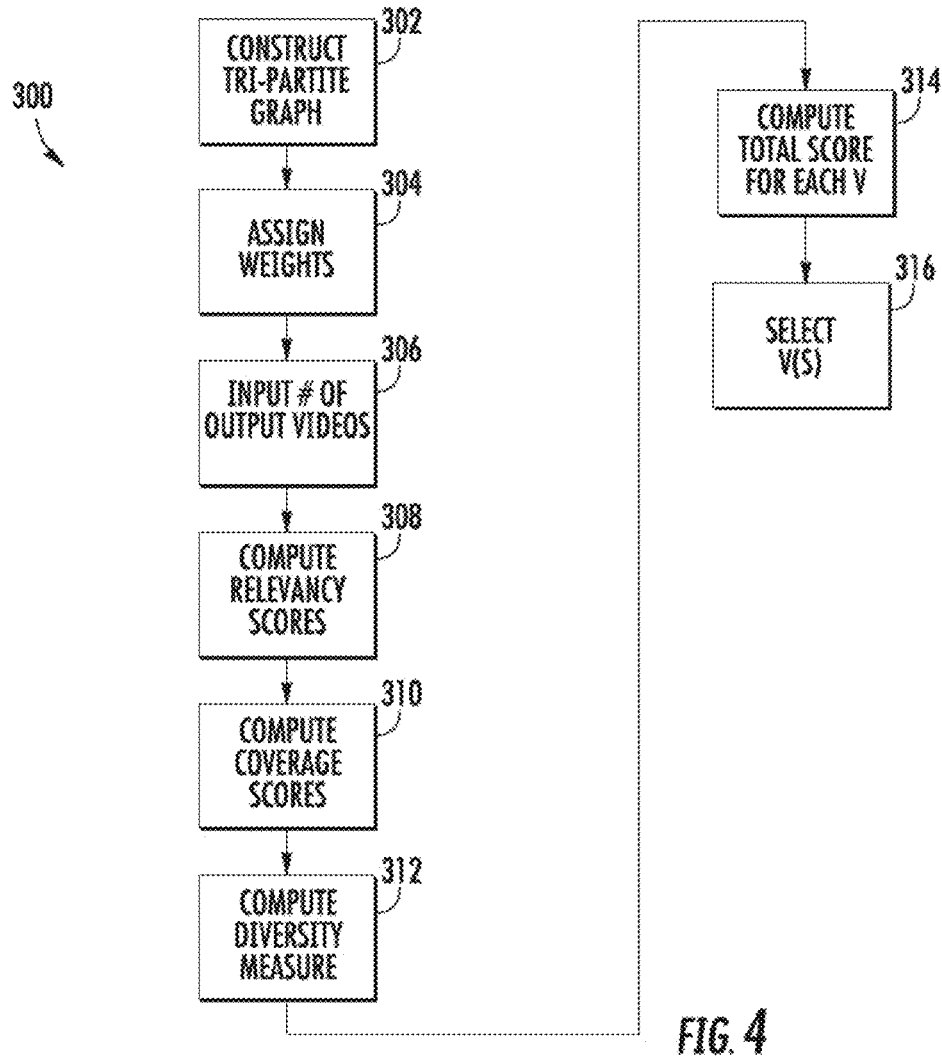
FIG. 4 is a flow diagram of an example video selection method.

FIG. 1 schematically illustrates a topic extraction and video association (TEVA) system 20. TEVA system 20 comprises a computer implemented system for automatically identifying and extracting topics from a digital text document, for selecting video for each of the extracted topics and for associating the selected video to the extracted topics. As a result, TEVA system 20 enhances a plain digital text document with videos (or links to videos) based upon computer-extracted topics from the plain digital text document. TEVA system 20 comprises external video content source 22, input 24, display 26, memory 28 and controller 30.

External video content source 22 comprises a source of video which is remote to memory 28 and controller 30. External video content source 22 may comprise a server or multiple servers (and their associated data stores) which provide access to video. Such external video content sources 22 may be accessible across a private or local area network, such as a company or organizational network, or a wide area network, such as the Internet 32.

Input 24 comprises an electronic device by which digital text documents may be input to system 20. In one implementation, input 24 may comprise a communication device, such as a wired or wireless ethernet port, a wireless card, a USB port, or the like for external communication, wherein data representing a digital text document may be electronically received. In another implementation, input 24 may comprise a data reading device that reads data representing a digital text document from a persistent storage device, examples of which include a disc reader, a flash memory or flash card reader and the like. In yet another implementation, input 24 may comprise a scanner, camera or other device that is configured to capture a printed upon medium (printed upon a physical sheet or other document form, i.e. a printed document) and generate a digital text document of the printed document. In some implementations, input 24 may include optical character recognition for creating a digital text document that may be searched and analyzed for topics.

In one implementation, input 24 further comprises a device by which a person may enter commands, selections or a digital text the document. For example, input 24 may comprise a keyboard by which a person may enter selections or commands or by which a person may actually type a digital text document to be modified by system 20. Input 24 may also comprise a touchpad, a mouse, a stylus, a microphone with associated speech recognition, or a touch screen incorporated as part of display 26.

Display 26 comprises a device configured to present a visual depiction or display of a digital text document and videos that have been associated to topics of the digital text document.

Memory 28 comprises a persistent storage device in the form of a non-transient computer-readable medium that contains stored data and instructions for use by controller 30. In addition to containing instructions for the operation of input 24 and display 26 as well as other components, memory 28 comprises data portions 40 and TEVA modules 42. Data portions 40 comprise source digital data, digital text documents 46 and internal video content 48, and the data resulting from the operation of system 20, video links or associated video 50 and combined text video 52 of the digital text document with links or associated video.

TEVA modules 42 comprise computer-readable code or other programming which instructs controller 30 in the automated identification and extraction of topics from a digital text document, the selection of video for each of the extracted topics and the association of the selected video to the extracted topics. TEVA modules 40 comprise an input module 60, a copy extraction module 62, a video source query module 64 and an optional analytic module 66. Input module 60 comprises a portion of code in memory 52 which directs controller 30 to input or otherwise receive a digital text document. For purposes of this disclosure, a "digital text document" is a digital form of a text document including text. The text document may additionally include graphics, photos, images and the like. In some implementations, the text document may include some video links or videos, wherein system 20 supplements are added to such links or videos. For purposes of this disclosure, the term "modified digital text document" refers to a digital text document to which video links or videos have been added for topics that have been extracted from the digital text document. Input module 60 may vary depending upon mechanism (examples of which are described above) by which system 20 is provided with the digital text document. For example, in implementations where input 24 comprises a scanner or camera, input module 60 may include optical character recognition code for converting the captured image into a digital text document that may be analyzed in searched for topics. In one implementation, input module 60 may convert a received digital text document into an appropriate format for use by system 20.

Topic extraction module 62, video source query module 64 and video to text association module 66 instructs controller 30 in the carrying out of method 100 shown in FIG. 2. Topic extraction module 62 carries out step 102 in method 100. Topic extraction module 62 comprises a section or a portion of code for directing controller 30 to identify or extract topics from the digital text document. Examples of topics that may be extracted from a given text input (the digital text document) include key phrases, concepts from an ontology such as WIKIPEDIA, or paragraph/section headings. An extracted topic may identify important named entities, such as Michael Faraday, John Ambrose Fleming or the like) making use of information boxes another annotation mechanisms found in the digital text document.

Topic extraction module 62 directs controller 30 to extract topics from the digital text document using a crowd sourced method, a predefined text analysis process, or a combination of both. In a crowd sourced method of topic extraction, topic extraction is based upon previously received topic identifications for the digital text document from a plurality of persons. In one implementation, multiple persons or users are asked to mark key phrases (not captured by any automatic method), wherein after each user marks a key phrase, a counter is incremented. Once a counter crosses a predefined threshold, the key phrase is included in the list of key phrases for the digital text document or the page.

Predefined textual analysis processes extract topics from the digital text document based upon an automated analysis of text characteristics in the digital text document. Examples of text characteristics used for such topic extraction include, but are not limited to, a word's or phrase's, position in a sentence, paragraph or heading, a font characteristic of a word or phrase (bold, italicized, underlined), and a frequency of a word or phrase in a paragraph, a section or on a page, a proximity of a word or phrase with respect to other identified topics or other words or phrases.

FIG. 3 is a flow diagram illustrating one example method 200 for extracting at least one topic from a document text document. As indicated by step 202, topic extraction module 62 directs controller 30 to extract all noun phrases. A phrase is a 2-3 gram co-occurring word that a special character or stop word in the middle. An n-gram is a contiguous sequence of n items or words from a given sequence of text. Examples of words or items include phonemes, syllables, letters, words or base pairs according to the application. An n-gram of size 1 is tamed to as a "unigram"; size 2 is a "bigram" (or, less commonly, a "digram"); size 3 is a "trigram"; size 4 is a "four-gram" and size 5 or more is called an "n-gram".

As indicated by step 204, topic extraction module 62 directs controller 30 to weigh each of the extracted noun phrases. In one implementation, each phrase is weighed using two parameters: a TF-IDF score and a graph-based ranking. A TF_IDF score is generated by indexing documents for a particular class and subject using an indexing engine such as Lucene. Lucene comprises a publicly available indexing and search library for use as part of a search engine, wherein its logical architecture is centered about a document containing fields of text.

With the graph-based ranking, each phrase or term is weighted based on frequency and position. Words or phrases that appear paragraph titles get higher weight. Words or noun phrases are also assigned weights based on how often they had co-occur with other highly weighted terms in the digital text document. Those words or phrases having the highest the scene base score a nice graph-based ranking form a pool or list of key phrases. In the example implementation being described, to facilitate the extraction of noun phrases covering an entire digital text document, each phrase or sentence is weighed based in part upon its proximity to other highly weighted or key phrases and additional noun phrases from lesser covered portions of the document are added to a pool of key or highly weighted noun phrases.

In some implementations, this pool of key phrases is sufficient for serving as a list of topics for subsequent selection of videos.

In certain circumstances, the pool of key phrases may be insufficient for a precise query for videos. For example, a noun phrase "fuel consumption" from a document on satellites may fetch videos like fuel consumption of cars and trucks. As a result, topic extraction module 62 further directs processor 30 to carry out steps 206-212 to enhance the key phrases.

As indicated by step 206, topic extraction module 62 directs controller 32 further extract a set of additional terms that co-occur with a particular key phrase in the digital text document. As indicated by step 208, the extracted co-occurring terms are weighted. According to one implementation, such terms are weighted, wherein the weight W of a term i co-occurring with a phrase j is determined as follows:

$$W(i \mid j) = \sum_{s \in S} e^{-0.1*dist(i,j|s)} * w(i)$$

Where:
S—sentences in the document where term i and keyphrase j co-occur
dist(i,j|s)—is the number of words between term i and keyphrase j
w(i)—weight of the word computed from the graph based keyphrase extraction method.

For each keyphrase or query, topic extraction module 62 directs controller 30 to identify a ranked list of term that can be added to the keyphrase during querying. Adding more terms to a key phrase or query can result in fewer videos to be retrieved while adding fewer terms can result in retrieving irrelevant videos. Each keyphrase should be treated independently as some keyphrases can be complete by itself.

To determine if additional terms should be added to a key phrase or query and to determine to what extent additional terms should be added, method 200 further utilizes the property of coherence to arrive at an optimal query set (a key phrase or query plus additional terms) that maximizes relevance of retrieved videos. As indicated by step 210, topic extraction module 62 further directs controller 30 to map each key phrase or query to a set of Wikipedia concepts. For each noun phrase or query, coherence is calculated as follows.

$$C(q_i) = \sum_{q_j \in Q, i \neq j} JS(q_i, q_j)$$

Where JS(qi, qj) is the Jacquard similarity between query i and j which is calculated using the Wikipedia concepts that map to each of the queries. (FIG. 5A illustrates the method for mapping a piece of text to a Wikipedia concept. Those queries or phrases with the lowest coherence using the high weighting term for that query are enhanced with extracted co-occurring terms having the greatest weight. This process is repeated, adding one or more co-occurring weighted terms at a time, until the query set is coherent (until the minimum coherence value reaches a threshold). The resulting query set serves as the topics extracted from a document.

As indicated by step 212, to narrow down a list of topics or query sets, topic extraction module 62 directs controller 30 to further identify a subset of the topics or query sets based upon a relevance. In particular, method 200 finds a subset of the queries for each page that are relevant to the page and cover the content of the page. In one implementation, the page relevance is calculated using TF-IDF of the terms in the query, where TF is the term frequency in the page and IDF is the inverse of the term frequency over the entire document. As a result, method 200 produces a page wise sequence of topics in a document.

Video source query module 64 carries out step 104 in FIG. 2. Video source query module 64 comprises a section or a portion of code for directing controller 30 to search one or more video sources and to identify and select one or more videos based upon the topics extracted in step 102. Video source query module 64 obtains a set of candidate videos or candidate video links, in one implementation, video links are mined or obtained from external video content source 22. In one implementation, such video links are obtained from publicly available Internet video sources such as Wikipedia, YouTube, University sites or educational content providers. In another implementation, local area network video sources or cloud-based video sources, such as video repositories of a company or organization may alternatively or additionally be searched and mined for either video links or the videos themselves. In yet other implementations, video links or videos themselves may alternatively or additionally be mined or otherwise obtained from internal video content 48 on memory 28. For example, the user's video collection on the user's laptop or desktop may be searched for existing video content.

For each candidate video or video link, system 20 carries out an automated, computer implemented process for determining whether a particular candidate video or video link should be added to the digital text document being enhanced. In one implementation, the view source query module 64 directs controller 30 to apply a predefined filtering method or process to each candidate video or video link as each candidate video or video link is found. In another implementation, video source query module 64 directs controller 30 to first gather a set of candidate video or video links and then apply a predefined filtering method or process to the set, whereby controller 30 may compare the candidates within the set in determining which candidates to apply to the digital text document being enhanced.

According one example, video source query module 64 may direct controller 30 to apply the predefined filtering method or process once the set of candidate video or video links has reached a predetermined number or size. Out of this initial set of candidates, controller 30 may identify a chosen subset of videos and links. As additional candidate videos (and their links) are found, such new candidates may be compared with the initially chosen subset, wherein the subset of selected videos and links may change as new videos and links are found and as such new videos and links replace the videos and links in the initial chosen subset.

According to one implementation, video source query module 64 applies multiple selection factors in selecting or determining which videos (or their links) should be added to the digital text document being enhanced. To evaluate candidate videos against such selection factors, video source query module 64 may direct controller 30 to analyze metadata associated with candidate videos or other existing and identified or quantified characteristics associated with the candidate videos. Examples of such factors include, but are not limited to, video popularity, video recency, video duration, video uploader, degree of overlap amongst videos, coverage of the extracted topics, relevance to the extracted topics and topic relationships. The selection criterion, video popularity, refers to how often a particular video has been viewed. For example, candidate videos may be selected based upon whether the candidate video has a number of views that exceeds a predefined threshold. One candidate video may be selected over another candidate video if the candidate video has more views than the other candidate video. For example, a candidate YouTube video may have more recorded views as compared to another candidate YouTube video.

The selection criterion, video recency, refers to the age of a particular candidate video. When selecting between two candidate videos, video source query module 64 may direct controller 30 to select the more recent candidate video because it might have more recent or current information. Alternatively, video source query module 64 may direct controller 30 to choose an older candidate video because the older candidate video may be more established, subjected to a greater amount of review for accuracy.

The selection criterion, video duration, refers to the duration or length of time of a candidate video. For example, in one implementation, controller 30 may prompt a user or person, through display 26, to identify or input a duration value or time constraint for the final enhanced digital text document. In other implementations, system 20 may impose a predefined duration value or time constraint for which the enhanced digital text document is not to exceed. Video source query module 64 may direct controller 30 to filter out or exclude one candidate video which may have a duration causing the enhanced digital text document to exceed the digital text document duration value. Video source query module 64 may direct controller to filter out or exclude candidate videos that have a duration value greater than a predefined threshold value. In yet other implementations, video source query module 64 may filter out candidate videos having an insufficient duration, a duration that does not satisfy a predefined lower threshold based on the philosophy that such short videos may not adequately cover a topic with sufficient depth. In some examples, feel source query module 64 may direct controller 32 to select candidate videos having a duration between an upper and a lower predefined duration threshold.

The selection criterion, video uploader refers to the importance of the uploader of the video to the context of the digital text document. For example, 'khan academy" can be a more relevant channel for videos than MIT for a $10^{th}$ standard Physics textbook. In one embodiment, the importance of the video uploader is computed as the number of keyphrases that retrieved videos from a particular uploader. The more the keyphrases retrieve videos of a particular uploader, the uploader becomes more trusted.

The selection criterion, degree of overlap amongst candidate videos, refers to an extent to which a candidate video scope overlaps the scope of other selected or candidate videos. In other words, video source query module 64 may cause controller 32 to favor a set of videos which exhibit diversity where any pair of videos have little, if any, overlapping content. In one implementation, this diversity factor may be assigned a lesser weight for those topics which have a higher topic weight (identified as more important) based on the notion that redundancy or overlap may be beneficial for such higher-rated topics.

The selection criterion, coverage of extracted topics, refers to how adequately a candidate video or set of candidate videos covers most or all of the extracted topics in the digital text document to be enhanced with video or video links. This coverage factor may be weighted depending upon the weight or importance of the extracted topic needing to be covered. For example, if a highly weighted or important attracted topic is not yet covered by an existing set of selected videos, a candidate video that does not score or rate well under the other factors (popularity, diversity, duration etc.) may still be selected because the candidate video fills a void by covering the yet uncovered highly weighted topic. Alternatively, if the yet uncovered extracted topic has a low weight, the coverage factor may be assigned little weight for the topic, resulting in a candidate video that does not score or rate well under the other factors being not selected.

The selection criterion, Relevance to extracted topics, refers to how relevant a candidate video or set of candidate videos is to the extracted topics. Each candidate video is assigned a weight or score depending upon how relevant it is to extracted topic. The relevance weight can be assigned based on popularity, recency of the video, personalization based on the user's profile interests, trust in the video uploader and other context-based scores. In one embodiment, Relevance is computed as described below on the tripartite graph constructed for the entire book/chapter. A combination of these weights may also be used.

The selection criterion, topic relationships, refers to how one topic may be a prerequisite to another topic. Topics that are prerequisites to other topics may be identified by the order in which they appear in the digital text document or by the existence of citations in the digital text document under one topic heading referring back to a previous topic. Applying such a selection topic, video source query module 64 may direct controller 30 to select a first candidate video over a second candidate video because the first candidate video covers the prerequisite topic to a greater extent or in a more relevant manner. When budgeting videos amongst multiple extracted topics in the digital text document, video source query module 64 may direct controller 30 to budget more duration time or a larger number of videos to those topics that occur earlier on or which are identified as being prerequisite or foundational to subsequent topics.

Figure 5:
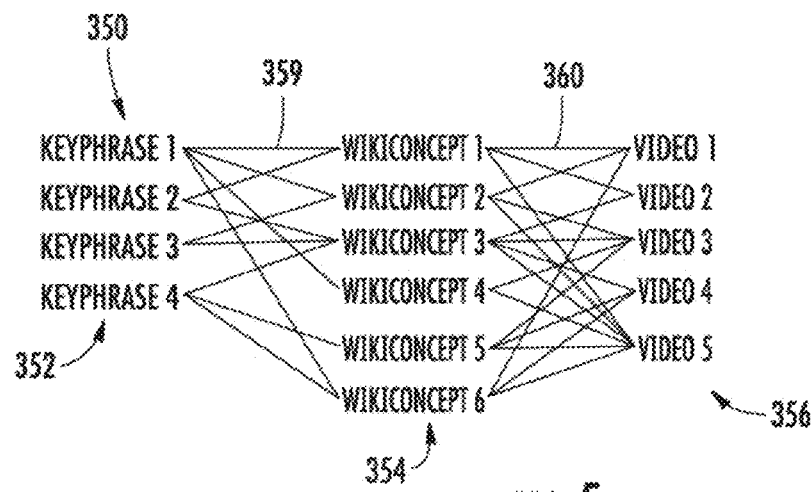
FIG. 5 is a diagram of an example tripartite graph and a used with the example video selection method of FIG. 4.
Figure 5A:
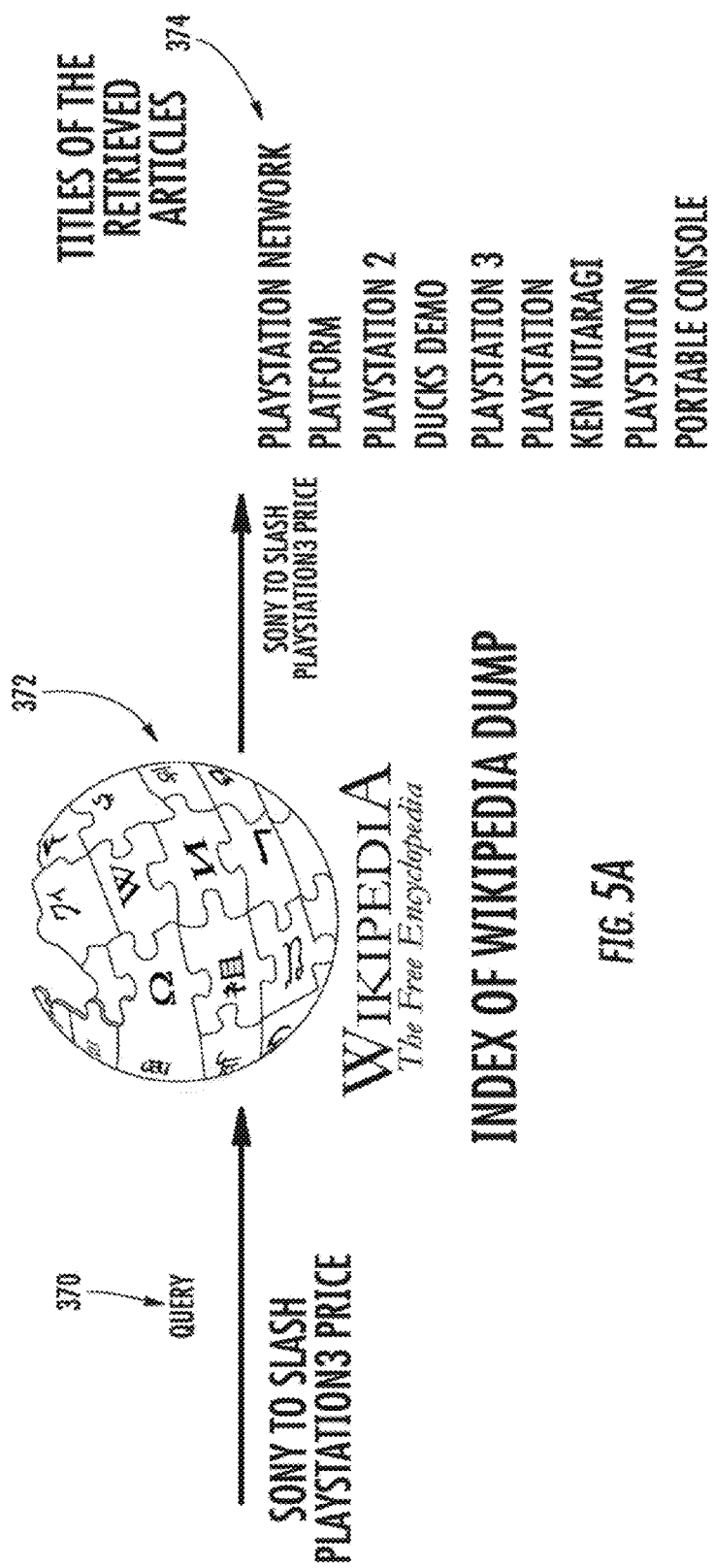
FIG. 5A is a flow diagram illustrating one example of mapping a piece of text to a Wikipedia concept.

FIGS. 4 and 5 illustrate one example method 300 for selecting one or more videos for the extracted topics per step 104 in FIG. 2. The example method 300 selects videos (or their links) using three selection factors, relevancy, coverage and diversity. In other implementations, method 300 may additionally be modified to incorporate other factors such as popularity, recency, duration and the like.

In one implementation, method 300 may identify a direct relationship between the candidate videos and the extracted keyphrases. For example, method 300 may determine a simple count of matching words (after stop-word removal and stemming). This can be done, for example, by matching keyphrases to strings in the title, tags, description of the videos. However, this may not yield a large enough intersect to assess performance objectives like relevance and diversity.

As a result, in other implementations, a keyphrase expansion technique may be utilized, both on the extracted keyphrases and on the video metadata, and then the expanded domain is leveraged to obtain a large enough intersect. One example of such a keyphrase expansion technique is the use of a tripartite graph as carried out by step 302.

As indicated by step 302, video query source module 64 directs controller 30 to construct a logical tri-partite graph. FIG. 5 is a diagram conceptually illustrating one example of such a logical tri-partite graph 350. As shown by FIG. 5, graph 350 denotes the relationships between the extracted topics or key phrases 352, Wikipedia concepts. 354 and candidate videos 356. For example, a particular Wikipedia concept 354 may be associated with multiple different extracted topic 352 and may be covered by multiple different candidate videos 356. The relationship between key phrases 352, Wikipedia concept 354 and candidate videos 356 are represented by edges 360. It should be noted that alternate/additional domain specific concept ontologies can also be used whenever available.

FIG. 5A illustrates one example for obtaining Wiki concepts. As indicated by step 370, after the entire Wikipedia corpus 372 is first indexed using the Lucene engine, the keyphrases and video metadata are input as a queries to the Lucene engine. The titles 374 of the Wikipedia documents are then extracted from the results to the query ("hits" in Lucene terminology). These are the Wiki concepts 354 shown in FIG. 5 that are connected to the given keyphrase 352 or video 356, as the case may be.

As indicated by step 304 in FIG. 4, video source query module 64 directs controller 30 to assign weights to the edges 360. In edge has a weight of zero where there is no edge, for example, between key phrase 1 and Wikipedia concept 3. For each key phrase, the following relationships exist:

$$\sum_j w[K_i, W_j] = 1$$

$$\sum_j w[V_i, W_j] = 1.$$

The weights assigned to edges 360 are dependent upon the TF_IDF weights that are returned by the Lucene engine, as described above.

As indicated by step 306, in addition to the tri-partite graph and the weights, method 300 utilizes an input constituting a number of desired output videos. This value may be predetermined. In some implementations, this value may depend upon an input or predetermined amount of time duration for the number of videos. For example, the number of output videos may vary depending upon the collective duration of the videos.

Based upon the aforementioned three inputs, method 300 based upon three factors: relevance, coverage and diversity. As indicated by step 308, video source query module 64 directs controller 30 to compute a relevance score for each candidate video. In one example, the relevance score r[Vi] may be calculated on the tripartite graph for the whole chapter/book as shown below. In other implementations, other scores may be used such as popularity, recency, personalization and other context-based scores.

For each candidate video $V_i$ in V $$r[V_i] = \sum_j w[W_j] * w[V_i, W_j].$$

where * denotes multiplication, and $$w[W_j] = \sum_i w[K_i] * w[K_i, W_j]$$

for each $W_j$ end for $$r[V_i] = \frac{r[V_i]}{\sum_i r[V_i]}$$

normalize relevance scores
for each topic $K_i$ in K,
  compute topic-video weights $w[K_i, V_j]$ as follows:

$$w[K_i, V_j] = \sum_l w[K_i, W_l] * w[V_j, W_l]$$

end for $$w[K_i, V_j] = \frac{w[K_i, V_j]}{\sum_j w[K_i, V_j]}$$

normalize topic-video weights
Initialize V* to the video with highest relevance score, i.e., set V*=argmax r[$V_i$].
Iterate until |V*|=Q:
  Compute the residual weight $$C(V^*) = 1 - \sum_{l=1}^{M} \sum_{m=1}^{|V^*|} w[K_l] * w[K_l, m]$$

This is the weight of topics not covered by videos $V_m$ in V*
where * denotes multiplication, and for each $W_j$.

As indicated by step 310, video source query module 64 directs controller 30 to compute a coverage score for each candidate video. In one example, the coverage score C[Vj] may be calculated as follows:

For each candidate video $V_j$ in V\V*:

$$C(V_j) = \sum_{l=1}^{M} w[K_l, V_j] * u[K_l]$$

where $$u[K_l] = w[K_l] * \left(1 - \sum_{m=1}^{|V^*|} w[K_l, V_m]\right)$$

Compute the fractional residual coverage $$p[V_j] = \frac{C(V_j)}{C(V^*)}$$

As indicated by step 312, video source query module 64 directs controller 30 to compute a diversity score for each candidate video. In one example, the diversity score C[Vj] may be calculated as follows:

$$q[V_j] = \max_{V_l \in V^*} CS(v_j, v_l)$$

where CS denotes the cosine similarity and vectors $v_j$ and $v_l$ are formed as follows. Note that $w[V_j, W_i]=0$, if there is no edge connecting video $V_j$ to wiki concept $W_i$ in T.

$$v_j=(w[V_j,W_1],w[V_j*,W_2], \ldots ,w[V_j,W_L])$$

$$v_l=(w[V_l,W_1],w[V_l,W_2], \ldots ,w[V_l,W_L])$$

Once the relevancy, coverage and diversity scores are calculated or measured in step 308-312, a total score for each candidate video is calculated as indicated by step 314. In particular, video source query module 64 directs controller 30 to compute a total score for each candidate video. In one implementation, the total score is calculated as follows:

$$S[V_j]=\alpha*p[V_j]-\beta*q[V_j]+(1-\alpha-\beta)*r[V_j]$$

where parameters $\alpha$, $\beta<1$ can be dynamically tuned as required.

Once the total scores are calculated for each candidate video, one or more videos are selected based upon such scores as indicated by step 316. In the above example implementation:

Select the candidate video $V_{j*}$ in V\V* with maximum score and add $V_{j*}$ to V*.

The number of videos selected may depend upon the desired number of output videos as input per step 306. As noted above, number of videos may depend upon a collective duration of the videos rather than a strict number of videos.

Figure 9:
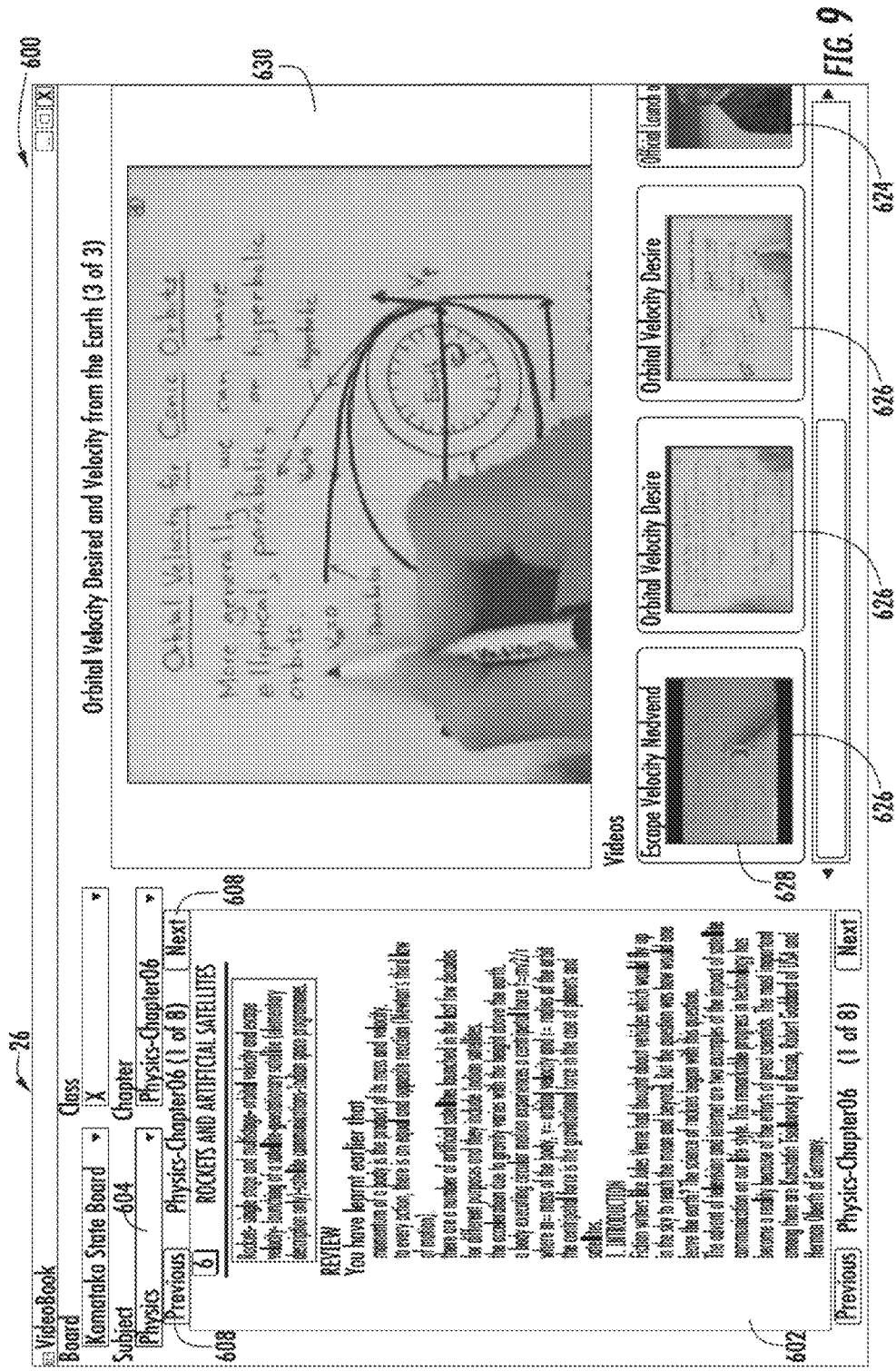
FIG. 9 is an example of a screenshot from a display during viewing of a modified digital text document.

As indicated by step 106 in FIG. 2, once candidate videos are selected, the selected videos are associated with the extracted topics. In one implementation, links to the selected videos are placed in the digital text document. In another implementation, the videos themselves are placed in the digital text document to create a multimedia document. In some implementations, both links and actual videos may be placed in the digital text document. In some implementations the document and videos are displayed side-by-side in the user interface such as shown in FIG. 9.

As shown by FIG. 1, memory 28 may additionally include an optional analytic module 66. Analytic module 66 comprises a section or a portion of code for directing controller 30 to analyze actual viewing of the modified digital text document and to potentially make subsequent changes to the modified digital text document based upon such analysis. In some implementations, analytic module 66 may direct controller 30 to prompt a person using the modified digital text document (using input 24 and/or display 26) to provide feedback regarding the modified digital text document that is being used. In some implementations, analytic module 66 may cause controller 30 to prompt the person viewing the modified digital text document to provide feedback regarding the topics that have been extracted as well as the videos that have been selected for the extracted topics. For example, the person may be asked to identify additional topics that have not been extracted or to indicate extracted topics that should be removed from the list of topics for which videos are to be associated. The person may be asked to express an opinion as to whether a video is too short, too long, too deep or detailed, too shallow or cursory, or simply inaccurate, contradictory or out of date. The person's feedback may also be stored in a database of memory 28. Changes made by analytic module 66 may result in a different set of topics being extracted for the particular digital text document or a different set of videos or video links being selected for digital text document. As a result, multiple versions of the modified digital text document may be stored for subsequent viewing. Alternatively, previous modified digital text documents may be deleted in favor of the later modified digital text documents that have been modified based upon such analytics. In other implementations, TEVA system 20 may omit analytic module 66.

Controller 30 comprises one or more processing units configured to carry out operations under the direction of TEVA modules 42. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 26 may be embodied as part of one or more application-specific integrated circuits (ASICs). Unless otherwise specifically noted, the controller is not limited to any specific combination of hardware circuitry and software, nor to any particular source for the instructions executed by the processing unit.

Figure 6:
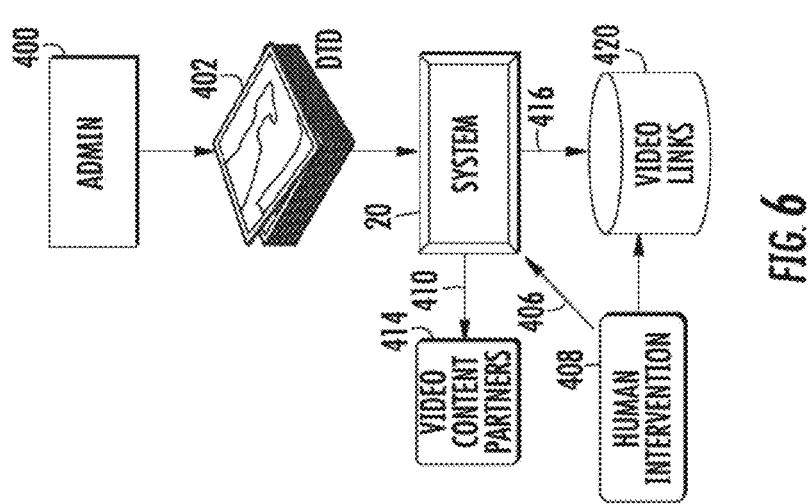
FIG. 6 is a diagram of an example operation of the topic extraction and video association system.

FIG. 6 is a diagram illustrating one example operation of TEVA system 20. As shown by FIG. 6, a source 400, such as an administrator, uploads a digital text document 402 to TEVA system 20. As indicated by arrow 406, system 20 receives input or human intervention 408. Such user input 408 may comprise a number of desired videos to be added (as noted in step 306 in FIG. 4) or may comprise duration preferences for individual videos or for an aggregate of the videos. For example, such user input 40 may comprise a maximum or minimum duration for an individual video. Such user input 408 may comprise a maximum or minimum duration for the videos combined. Such input 408 may comprise selections of various modes of operation or different selectable options (1) for extracting topics (how topics are extracted from a digital text document); modified digital text documents (2) for selecting videos (how videos are selected or from what video sources such videos are obtained); and (3) how such videos are associated with the extracted topics (whether links or the actual videos themselves are added to the digital text document or what factors are used to determine how such Association should be made).

As indicated by arrow 410, once the topics are extracted from digital text document 402, system 20 consults video content sites or video content partners 414 and further selects available videos. As indicated by arrow 416, after such videos are selected or identified, system 20 generates video links 420 for the digital text document 402 and for the topics extracted from the digital text document 402. In the example illustrated, such video links 420 are stored in a non-transient computer-readable medium or memory for subsequent use when digital text document 402 is being read.

Figure 7:
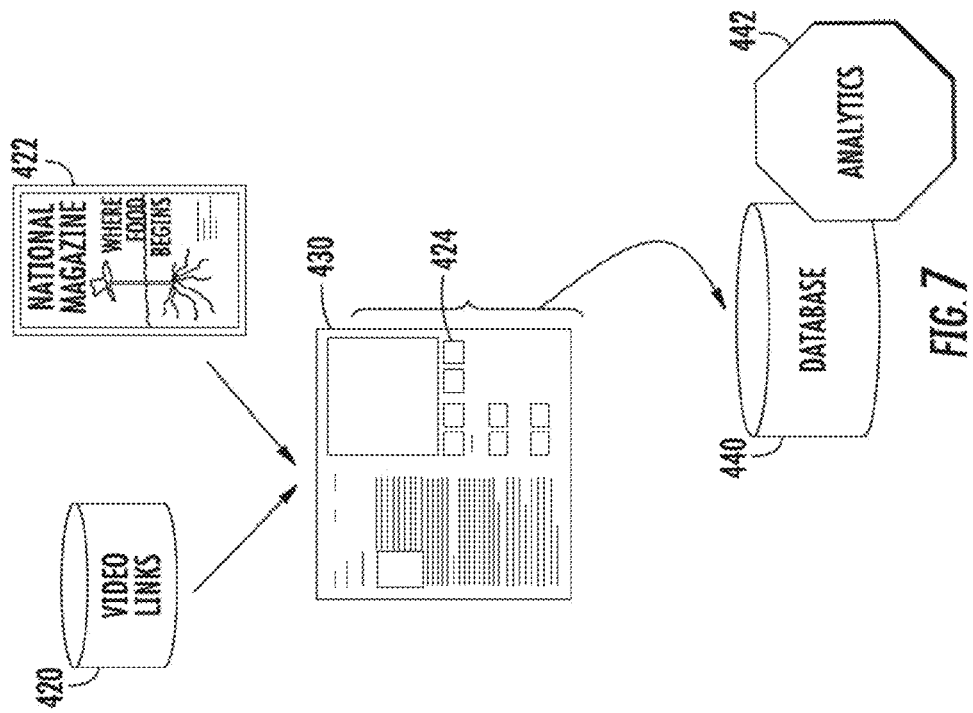
FIG. 7 is a diagram of an example use of a modified digital text document produced by the operation of FIG. 6.

FIG. 7 is a diagram illustrating one example use of the video links 420 generated in FIG. 6. As shown by FIG. 7, when a person accesses the digital text document 422 on user interface 430, a display of the modified digital text document (digital text document 422 and video links 420) is presented to the person on the user interface 430. In one implementation, a person may be provided with different modes by which the selected videos 424 may be retrieved and displayed using video links 420. In one selectable mode of operation, the videos are retrieved and presented on user interface 430 in response to the person actually selecting the video links (for example, by touching the link and tapping with a finger or by locating a cursor over the link and clicking a button) or otherwise providing commands activating the links. In another selectable mode of operation (shown in FIG. 7), the selected videos 424 are automatically retrieved and presented on user interface 430 in response to the digital text document 422 being opened. In such a mode, the video links 420 in the particular modified digital text document may or may not be additionally presented as part of the digital text document 422 on user interface 430.

As further shown by FIG. 7, in the example implementation illustrated, the person's interaction with user interface 430 may be captured and stored in a database 440. For example, the number of times that each particular selected video 424 is selected for viewing may be stored. The reordering of selected videos 424 by the person viewing the modified digital text document may be stored. In some implementations, user interface 430 (under the control of controller 30) may prompt the person viewing the modified digital text document 422 to provide feedback regarding the topics that have been extracted as well as the videos that have been selected for the extracted topics. For example, the person may be asked to identify additional topics that have not been extracted or to indicate extracted topics that should be removed from the list of topics for which videos are to be associated. The person may be asked to express an opinion as to whether a video is too short, too long, too deep or detailed, too shallow or cursory, or simply inaccurate, contradictory or out of date. The person's feedback may also be stored in database 440. As schematically represented in FIG. 7, such information stored in database 440 may be later retrieved and utilized by TEVA system 20 to perform analytics 442. Such analytics 442 may result in a different set of topics being extracted for the particular digital text document 422 or a different set of videos 424 or video links 420 being selected for digital text document 422. As a result, multiple versions of the modified digital text document 422 (with video links 420) may be stored for subsequent viewing. Alternatively, previous modified digital text documents 422 may be deleted in favor of the later modified digital text documents 422 that have been modified based upon such analytics 442.

Figure 8:
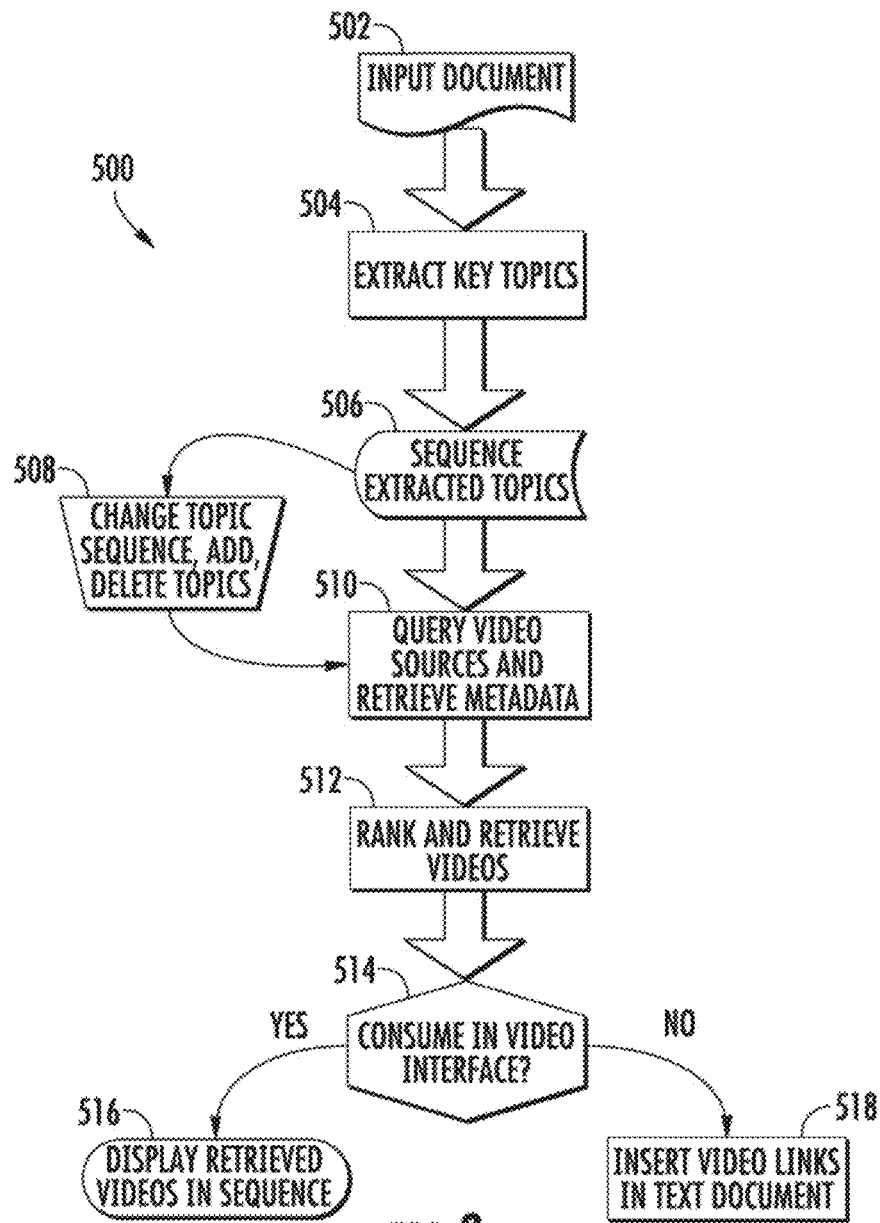
FIG. 8 is a flow diagram of another example topic extraction and video association method.

FIG. 8 is a flow diagram illustrating an example method 500, an alternative implementation of the more general method 100 described above with respect to FIG. 2. As indicated by step 502, input 24, under the control of input module 60, inputs a digital text document into TEVA system 20. The digital text document comprise any text document containing a sequence of topics such as a textbook chapter, magazine article, a Wikipedia page, a personally written document created by the person using system 20 or the like.

As indicated by step 504, controller 30, under the direction of copy extraction module 62 extracts key topics from the digital text document. One example method for the extraction of topics is shown and described above with respect to FIG. 3.

As indicated by step 506, controller further sequences the extracted topics. In one implementation, the topics are sequenced or ordered in a manner corresponding to the order in which the topics or identified or presented in the digital text document. As indicated by step 508, in one implementation, this order or sequence of the topics may be altered.

For example, topic extraction module 62, or other instructions contained in memory 28, may direct controller 30 to prompt a person with selectable options for changing the sequence of such extracted topics. In some implementations, topic extraction module 62 may further permit the person to add or delete topics.

As indicated by step 510, controller 30, under the direction of video source query module 64, accesses various video sources, such as external video content source 22 and internal video content 48 shown 1. In doing so, controller 30 retrieves metadata for the various videos found in such sources. Such metadata identify concepts discussed in such videos, the duration of such videos, the resolution of such videos, the author or creators of such videos, the date at which the video was created and/or updated or other characteristics of the videos. Such data are utilized in the selection of videos for the extracted topics.

As indicated by step 512, controller 30 utilizes the retrieve metadata to rank or select as well as retrieve videos or links to such videos. Such video selection may be based upon the individual duration of each of video, the collective duration of a set of videos, quality or reliability of a source of the video, authorship of the video, an online rating of the video (the counter number of views for the video online), or other factors as discussed above such as a degree of overlap amongst the videos, a coverage of the extracted topics, a relevance to the extracted topics, video popularity or video recency. One example method 300 for the selection of videos is described above with respect to FIG. 4. In other implementations, other methods may be used for video selection.

Steps 514, 516 and 518 illustrate the association of the selected videos to the extracted topics. As indicated by step 514, controller 30 determines whether the selected videos are to be consumed concurrently with the viewing of the digital text document. As indicated by step 516, if the selected videos are to be viewed concurrently with the viewing of the digital text document, the selected videos (or representations of the selected videos) are presented on display 26 for selection and/or viewing. The selected video may be stored in memory 28 (shown FIG. 1) or a link to the selected video may be used to automatically and temporarily play the video on the screen while the display digital text document is also displayed on the same screen. Alternatively, as indicated by step 518, if the selected videos are not to be viewed concurrently on one display or on one screen with the digital text document, controller 30 inserts links to the videos in the digital text document, wherein selection of the link exits the present display of the digital text document and changes to a display of the linked Internet, Internet or other site which is the source of the selected video.

FIG. 9 illustrates an example screenshot 600 that may be presented on display 26 by controller 30 when viewing a modified digital text document produced by TEVA system 20. As shown by FIG. 9, the digital text document may comprise a book, such as a textbook, having multiple chapters on multiple topics. In such an implementation, TEVA system 20 may carry out method 100 or method 500 on each page are each chapter of the book to form a modified digital text document of the book (identified as a "video book"). In the example illustrated, display 26 presents a portion 602 of the digital text document. Display 26 further presents identification information 604 identifying the subject being discussed, the chapter the books from which portion 602 is derived as well as other information. The person is allowed to go forward or backward in the digital text document using buttons 608.

As further shown by FIG. 9, display 26 further presents representations 626 of the selected videos 628 in the order at which the selected videos 628 will be presented. Display 26 further presents a viewing window or portion 630 on which the actual videos 628 may be watched. In such an implementation, the person may be provided with the option of choosing which of the selected video 628 should be played by selecting the associated video representation 626. For example, a person may touch the representation 626 (when display 26 comprises a touch screen) or may locate a cursor over a representation 626 and clicking are pressing a button, such as a button on the mouse, touchpad or the like. In this way, the person may choose to revisit a selected video 628. In one implementation, the person may also have the option of selecting and dragging or moving the various representation 626 to change an order of the representations 626, wherein the person has control over and may change the order in which the selected videos 628 are played. Although representations 626 are illustrated as thumbnails, in other implementations, representations 626 may comprise text or other graphic icons. In other implementations, modified digital text document may be presented in other fashions.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A computer-implemented method comprising:
extracting a topic from a digital text document, wherein the extracting includes identifying a first additional term in the digital text document that co-occurs with the topic;
obtaining a plurality of concepts;
automatically generating a first query that includes the topic and the first additional term;
determining coherency of the first query by mapping the first additional term to the plurality of concepts;
in response to determining that the first query is not coherent, identifying a second additional term in the digital text document that co-occurs with the topic;
automatically generating a second query that includes the topic, the first additional term, and the second additional term;
identifying a plurality of candidate videos from a video source, wherein the plurality of candidate videos are identified in response to the second query;
selecting a video from the plurality of candidate videos for the extracted topic based on a relationship between the extracted topic and the plurality of concepts, and based on relationships between the plurality of concepts and the plurality of candidate videos; and
associating the selected video with the extracted topic.

2. The method of claim 1, wherein the topic is extracted based upon topic identifications from a plurality of persons.

3. The method of claim 1, wherein the topic is extracted with a predefined text analysis process.

4. The method of claim 1, wherein the video is selected further based upon at least one factor selected from a group of factors, wherein the group of factors comprises video popularity, video recency, and video duration.

5. The method of claim 1, further comprising:
prompting a person to input an evaluation of the selected video; and
subsequently selecting the video based at least in part upon the evaluation.

6. The method of claim 1, wherein the video is selected further based upon prior viewing of the video with the digital text document.

7. The method of claim 1, further comprising:
extracting a plurality of topics from the digital text document;
selecting a plurality of videos for the plurality of topics; and
associating the plurality of videos to the plurality of topics.

8. The method of claim 7, further comprising:
identifying a document topic sequence; and
sequencing the plurality of videos based upon the document topic sequence.

9. The method of claim 7, further comprising:
analyzing video source topic sequences; and
sequencing the plurality of videos based upon the video source topic sequences, wherein the plurality of videos are sequenced differently than a sequence of the extracted topics in the digital text document.

10. The method of claim 7, further comprising:
presenting a topic sequence for the extracted topics to a person; and
altering the topic sequence based upon input from the person.

11. The method of claim 7, wherein the plurality of videos are selected further based on at least one factor selected from a group of factors, wherein the group of factors comprises a degree of overlap amongst the videos, a coverage of the extracted topics and relevance to the extracted topics.

12. The method of claim 7, further comprising:
prompting a person to identify a duration value for the digital text document; and
selecting the plurality of videos based upon the duration value.

13. The method of claim 7, wherein the plurality of videos are selected for a portion of the extracted topics based upon whether each topic is a prerequisite for other extracted topics.

14. The method of claim 1, wherein a weighting is applied to the first and second additional terms, the weighting based on a graph-based keyphrase extraction.

15. The method of claim 14, wherein the first additional term is weighted higher than the second additional term based on the weighting.

16. The method of claim 1, wherein determining that the first query is not coherent comprises:
determining that the coherency fails to reach a predetermined threshold.

17. The method of claim 1, further comprising:
determining the coherency of the second query by mapping the second additional term to the plurality of concepts;
in response to determining that the second query is not coherent, identifying a third additional term in the digital text document that co-occurs with the topic;
generating a third query that includes the topic, the first additional term, the second additional term, and the third additional term; and
identifying the plurality of candidate videos from the video source, wherein the candidate videos are identified in response to the third query.

18. The method of claim 1, wherein obtaining the plurality of concepts comprises:
obtaining the plurality of concepts from a concept ontology that is external to the digital text document.

19. An apparatus comprising:
a non-transient computer-readable medium comprising code for directing a processor to:
extract a topic from a digital text document by identifying a first additional term in the digital text document that co-occurs with the topic;
obtain a plurality of concepts;
automatically generate a first query that includes the topic and the first additional term;
determine coherency of the first query by mapping the first additional term to the plurality of concepts;
in response to determining that the first query is not coherent, identify a second additional term in the digital text document that co-occurs with the topic;
automatically generate a second query that includes the topic, the first additional term, and the second additional term;
identify a plurality of candidate videos from a video source, wherein the plurality of candidate videos are identified in response to the second query;
select a video from the plurality of candidate videos for the extracted topic based on a relationship between the extracted topic and the plurality of concepts, and based on relationships between the plurality of concepts and the plurality of candidate videos; and
associate the selected video with the extracted topic.

20. A system comprising:
an input module to receive a digital text document;
a topic extraction module to extract a topic from the digital text document by identifying a first additional term in the digital text document that co-occurs with the topic;
a video source query module to obtain a plurality of concepts, automatically generate a first query that includes the topic and the first additional term, determine coherency of the first query by mapping the first additional term to the plurality of concepts, in response to determining that the first query is not coherent, identify a second additional term in the digital text document that co-occurs with the topic, automatically generate a second query that includes the topic, the first additional term, and the second additional term, identify a plurality of candidate videos from the a video source based on the second query, and select a video from the plurality of candidate videos for the extracted topic, based on a relationship between the extracted topic and the plurality of concepts, and based on relationships between the plurality of concepts and the plurality of candidate videos; and
a video to topic association module to associate the selected video to the extracted topic in a display of the digital text document.

* * * * *